United States Patent
Lippert et al.

(10) Patent No.: US 6,659,074 B2
(45) Date of Patent: Dec. 9, 2003

(54) SPARK IGNITION DIRECT INJECTION ENGINE WITH SHAPED MULTIHOLE INJECTORS

(75) Inventors: Andreas M. Lippert, Rochester Hills, MI (US); Sherif Hussein El Tahry, Troy, MI (US); Hiroaki Inoue, Hamamatsu Shizuoka (JP); Takahiro Noyori, Hamamatsu Shizuoka (JP)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/325,655

(22) Filed: Dec. 20, 2002

(65) Prior Publication Data

US 2003/0209222 A1 Nov. 13, 2003

Related U.S. Application Data

(60) Provisional application No. 60/378,738, filed on May 8, 2002.

(51) Int. Cl.[7] ................................................. F02B 3/00
(52) U.S. Cl. .................. 123/299; 123/305; 239/533.12; 239/601
(58) Field of Search ................................. 123/299, 305, 123/294; 239/533.12, 601

(56) References Cited

U.S. PATENT DOCUMENTS

| 4,986,478 A | * | 1/1991 | Bertini ..................... 239/585.4 |
| 5,740,777 A | | 4/1998 | Yamamoto et al. ......... 123/305 |

OTHER PUBLICATIONS

SAE Technical Paper, 2001–01–0970, "Methods and Analysis of Fuel Injection, Mixture Preparation and Charge Stratification in Different Direct Injected SI Engines", Rainer Ortmann, Stefan Arndt, Jurgen Rainmann, roman Grzeszik and Gernot Wurfel, Robert Bosch GmbH, SAE 2001 World Congress Detroit, Michigan, Mar. 5–8, 2001.

SAE Technical Paper, 980149, "Simultaneous Attainment of Low Fuel Consumption High Output Power and Low Exhaust Emissions in Direct Injection SI Engines", Yasuo Takagi, Teruyuki Itoh, Shiego Muranaka, Akiriro Iiyama, Yasunori Iwakiri, Tomonori Urushihara and Ken Naitoh, Nissan Motor Co., Ltd., International Congress and Exposition, Detroit, Michigan, Feb. 23–26, 1998.

SAE Technical Paper, 1999–01–0505, "Characteristics of Mixture Formation in a Direct Injection SI Engine with Optimized In–Cylinder Swirl Air Motion", Akihiko Kakuhou, Tomonori Urushihara, Teruyuki Itoh and Yasuo Takagi, Nissan Motor Co., Ltd. International Contress and Exposition, Detroit, Michigan, Mar. 1–4, 1999.

(List continued on next page.)

Primary Examiner—Bibhu Mohanty
(74) Attorney, Agent, or Firm—Kathryn A. Marra (57) ABSTRACT

A fuel injector for a spark ignition direct injection engine includes an injection having plurality of spray holes formed in a generally semicircular pattern wherein the spray holes have a L/D (length over diameter) ratio of not more than 2.0. In a preferred embodiment, the injector nozzle has an internal sac and an end wall with part spherical inner and outer surfaces formed with a common center, the pattern of the spray holes includes a semicircle formed by an arc having ends connected by a straight line wherein the spray holes have outlet openings that are spaced along the arc and slightly below the straight line, and the spray holes lying on the semicircle extend from the common center while the spray holes lying below the straight line have axes extending from above the common center. In an engine, the flat side of the spray is aimed toward the near side of a piston bowl recess.

17 Claims, 4 Drawing Sheets

Semi-circular spray pattern (footprint)

OTHER PUBLICATIONS

SAE Technical Paper, 970541, "Development of Gasoline Direct Injection Engine", Y. Iwamoto, K. Noma, O. Nakayama, T. Yamauchi and H. Ando, Mitsubishi Corp., pp. 1–17.

SAE Technical Paper, 970540, "Development of Direct Injection Gasoline Engine", Jun Harada, Tsutomu Tomita, Hiroyuki Mizuno, Zenichiro Mashiki, and Yasushi Ito, Toyota Motor Co., pp. 1–10.

SAE Technical Paper, 980158, "Mixing Control Straategy for Engine Performance Improvement in a Gasoline Direct Injection Engine ", Kazunari Kuwahara. Katsunori Ueda and Hiromitsu Ando, Mitsubishi Motors Corp., International Congress and Exposition, Detroit, Michigan, Feb. 23–26, 1998.

SAE Technical Paper, 2000–01–0530, "Research and Development of a New Direct Injection Gasoline Engine", Makoto Koike and akiniro Saito, Toyota Central R&D Labs., Inc. Terutoshi Tomoda and Yasushiro Yamamoto, Toyota Motor Corp., SAE 2000 World Congress, Detroit, Michigan, Mar. 6–9, 2000.

SAE Technical Paper, 2000–01–0531, "Application of a New Combustion Concept to Direct Injection Gasoline Engine", Mutsumi Kanda, Toyokazu Baika, Senji Kato and Minoru Iwamuro, Toyota Motor Corp., Makoto Koike and Akinori Saito, Toyota Central R&D Labs, Inc. SAE 2000 World Congress Detroit, Michigan, Mar. 6–9, 2000.

* cited by examiner

PRIOR ART
FIG. 1

Semi-circular spray pattern (footprint)

SPARK IGNITION DIRECT INJECTION ENGINE WITH SHAPED MULTIHOLE INJECTORS

This application claims priority of U. S. Provisional Application No. 60/378,738 filed May 8, 2002.

TECHNICAL FIELD

This invention relates to spark ignition direct injection engines and to injectors for such engines having a plurality of spray holes formed in an advantageous pattern.

BACKGROUND OF THE INVENTION

In recent years many internal combustion engines have been proposed which have tried to improve fuel consumption by direct fuel injection into the cylinder. By injecting during the compression stroke at part load conditions, a suitable amount of fuel vapor is collected around the spark plug, and overall lean operation is realized. Several four valve SIDI engines have been disclosed. Many of these use a swirl type fuel injection device in which the fuel is injected with a swirl component. Also proposed has been a slit (fan) spray configuration.

Figure 1:
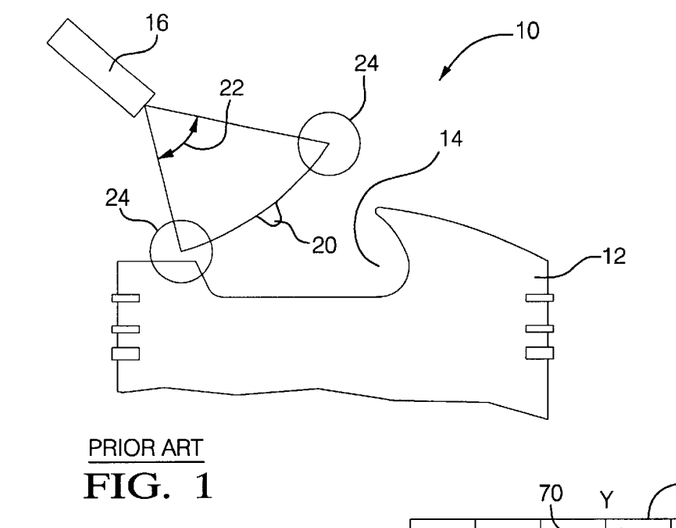
FIG. 1 is a schematic view previously described of a prior art engine piston with a swirl type injector.

FIG. 1 schematically represents a prior art engine 10 having a piston 12 with a bowl recess 14 positioned toward the intake valve side of the cylinder not shown. An injector 16 provides a generally cone shaped swirl type spray 18 which is injected toward the bowl recess 14 as the piston rises on the compression stroke. However there is an initial spray 20 which does not have a swirl component. This initial spray has a relatively large spray particle size and, because atomization is poor, it results in smoke generation and unburned hydrocarbons (HC). Further, because even the main spray shape 18 is restricted to a cone shape the fuel is not optimally distributed on the piston. The lower part of the cone shaped spray directly below the injector will contact the piston first and can cause a liquid film on the surface which generates smoke. Also, portions of the spray may interact with the piston outside of the bowl recess creating a dispersed cloud which adversely affects combustion and unburned HC emissions. Additionally, the spray angle 22 can vary (become smaller) due to conditions of fuel temperature, cylinder pressure and the like so that it is difficult to control the mixing condition of the spray.

SUMMARY OF THE INVENTION

The present invention provides a spark ignition direct injection (SIDI) engine having a combustion chamber defined in part by a piston bowl recess and a fuel injector for such an engine. The injector includes an injection nozzle for directing a fuel spray into the combustion chamber wherein the nozzle has a plurality of spray holes formed in a generally semicircular pattern. The pattern of the fuel spray at a fixed distance below the injector nozzle under atmospheric conditions approximates a semicircle formed by an arc having ends connected by a straight line and wherein intermediate positions of the sprays are spaced along the arc and the straight line while end sprays are located at the intersection of the arc and straight line.

The spray pattern is formed by a nozzle having multiple spray holes formed in an approximate semicircle joined at its ends by a straight line. The spray holes lying on the semicircle, including those at the ends of the straight line, have axes extending from the center of a part spherical fuel sac within the injector nozzle, while the intermediate spray holes along the straight line have centers extending from above the center of the injector nozzle fuel sac. The intermediate holes are thereby offset slightly below the straight line in order to increase turbulence of the fuel in the intermediate spray holes to be equivalent with the holes located around the periphery of the arc so that penetration of the sprays from all the spray holes is essentially the same and result in the desired semi-circular spray pattern.

The approximately semicircular spray hole pattern and the resulting semicircular fuel spray pattern can provide a fuel spray which is contained almost entirely within the piston bowl recess and is largely vaporized before striking the surface of the piston so that production of smoke is minimized and fuel economy is maximized.

Preferably the spray holes of the nozzle have a length over diameter (L/D) ratio of 2.0 or less. In tests of a specific embodiment, five spray holes arranged with four holes around the periphery of the semicircular arc and a central (intermediate) hole between the end holes on the straight line was found to provide the best in smoke and fuel economy. However, six holes were also projected to fall within the desired smoke limit. It is anticipated that for larger engine sizes, an additional number of holes up to around ten or more may be utilized to obtain similar results.

These and other features and advantages of the invention will be more fully understood from the following description of certain specific embodiments of the invention taken together with the accompanying drawings.

DESCRIPTION OF THE PREFERRED EMBODIMENT

Figure 2:
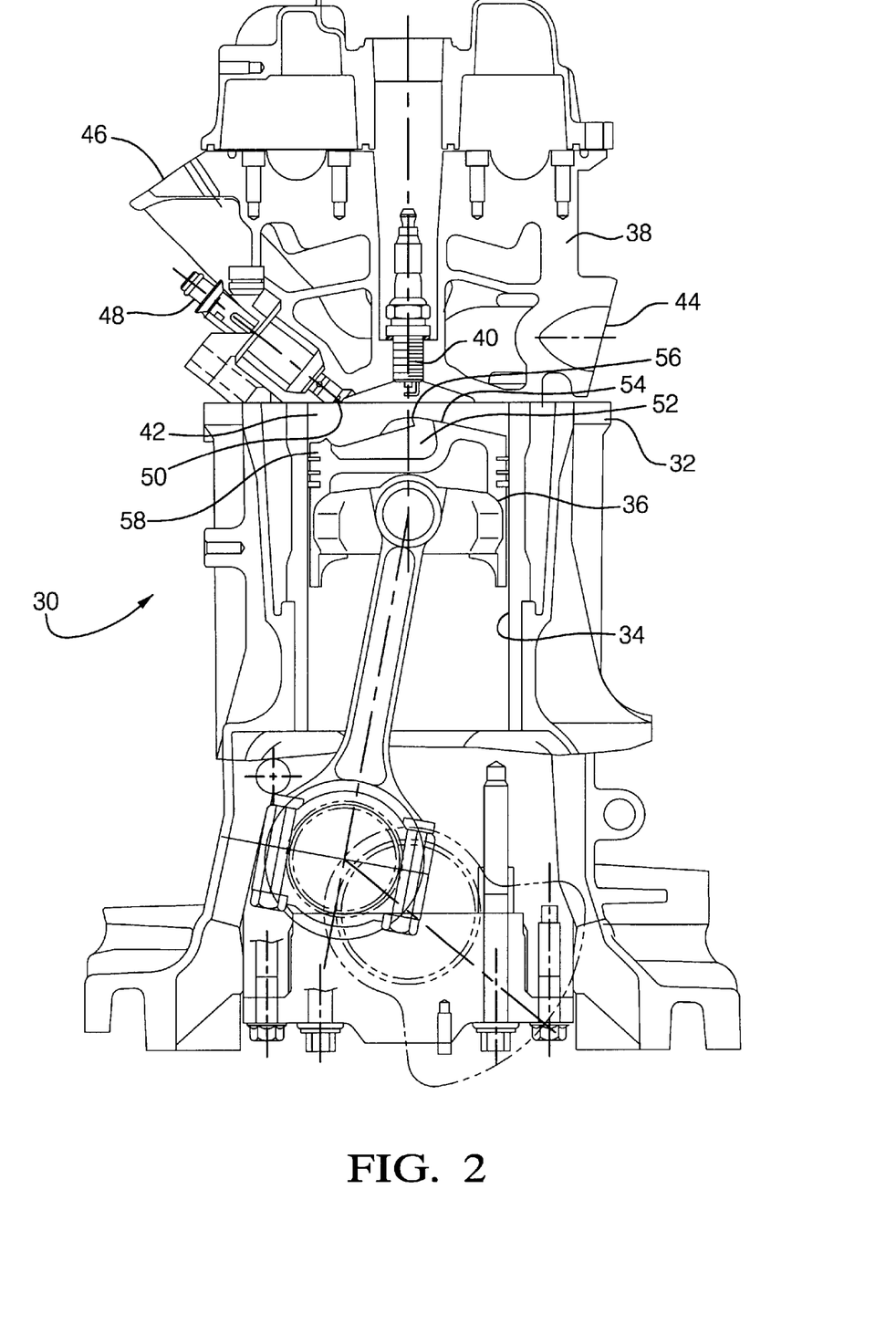
FIG. 2 is a cross-sectional view of a spark ignition direct injection engine having a fuel injector with a shaped multi-hole spray nozzle in accordance with the invention.

Referring now to FIG. 2 of the drawings, numeral 30 generally indicates a spark ignition direct injection (SIDI) engine, pertinent portions of which include an engine block 32 having a plurality of cylinders 34 only one of which is shown. The cylinder 34 is closed by a cylinder head 38 carrying a central spark plug 40 extending into a combustion chamber 42 defined by the piston and the cylinder at its closed end. The cylinder head includes exhaust ports 44 extending from an exhaust side of the combustion chamber and intake ports 46 extending into the intake side of the combustion chamber. A fuel injector 48 includes an injection nozzle 50 aimed at a downward angle into the intake side of the combustion chamber toward a bowl recess 52 in the piston upper surface 54 and extending from a central area 56 of the piston toward the intake side 58 of the piston.

Figure 3:
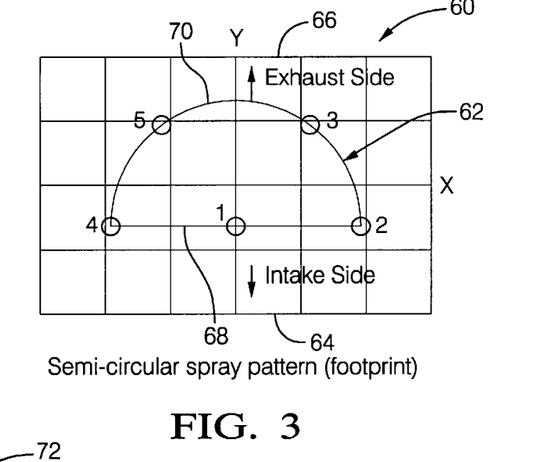
FIG. 3 is a diagram indicating the semicircular spray pattern created by the injector nozzle as formed under atmospheric conditions.

Referring now to FIG. 3, a grid 60 is shown on which is drawn a representative semicircular spray pattern 62 showing the locations of the central portions of the five sprays numbered 1, 2, 3, 5, 4 forming the semicircular pattern. The positions indicated represent the central position of each spray 50 mm below the injector under atmospheric conditions. X and Y coordinates are shown wherein the X coordinate represents the dimension across the piston recess 52 and the Y coordinate represents the radial distance from the intake side 64 of the recess to the exhaust side 66 of the recess as indicated in the diagram. Note that sprays 2, 1, and 4 are aligned in essentially a straight line 68, while sprays 2, 3, 5, and 4 are all positioned on the semicircular arc 70.

Since sprays 2 and 4 lie on both the arc 70 and the straight line 68, they both share the same Y coordinate with the center spray 1, the only intermediate spray on the line 68 in this embodiment of the spray pattern. The Y coordinates of sprays 3 and 5 are offset from spray 1 by about 10–20 mm toward the exhaust side 66 of the spray pattern. The X coordinates of sprays 2 and 4 are oppositely offset from spray 1 by 15–25 mm and the X coordinates of sprays 3 and 5 are offset from that of spray 1 by 5–15 millimeters.

Figure 4:
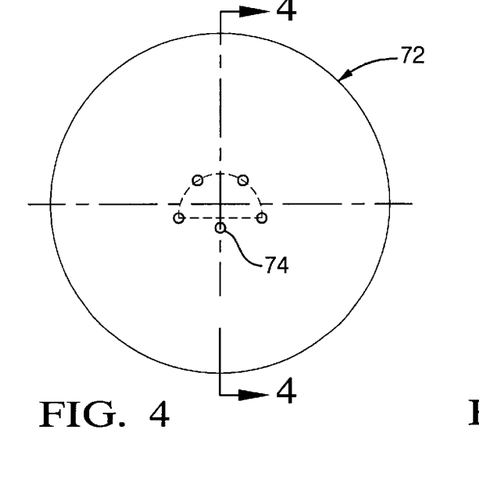
FIG. 4 is a bottom view of an injector nozzle showing a spray hole pattern of five holes in a semicircular pattern.
Figure 5:
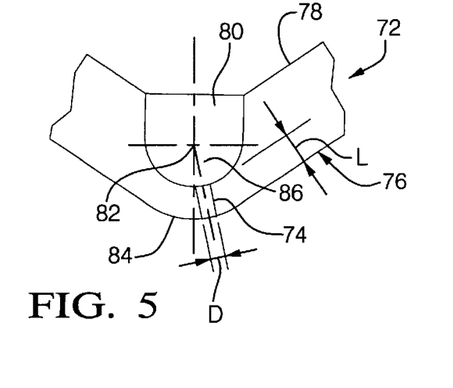
FIG. 5 is a cross-sectional view of the bottom of the injector nozzle from the line 5—5 of FIG. 4.

FIG. 4 is an end view of a spray nozzle 72 designed to form the semicircular spray pattern of FIG. 3. Note that the spray holes, not numbered except for the center hole 74, are formed in an approximately semicircular pattern similar to FIG. 3. FIG. 5 is a cross-sectional view from the line 5—5 of FIG. 4 and illustrates the generally conical injector end wall 76 which internally includes a valve seat 78 at the tip of which is a recessed volume referred to as a sac 80. The bottom of the sac is hemispherical and has a center 82 which is a common center with a part spherical outer surface 84 of the wall 76 at the tip of the conical configuration.

The orifices have a length L and a diameter D, which forms a ratio L/D that, for all of the orifices, has a numerical value not greater than 2.0. In this embodiment all the orifices including the central orifice 74 had axes extending from the common center 82 through the lower wall at their respective locations as shown in FIG. 5

Testing of the embodiment of FIGS. 4 and 5 showed that the center hole 74 gave significantly greater penetration of fuel into the engine combustion chamber than the remaining spray holes arranged in the semicircular arc, not numbered. However, it was desired that the penetration of all the fuel sprays be made essential equal.

Figure 6:
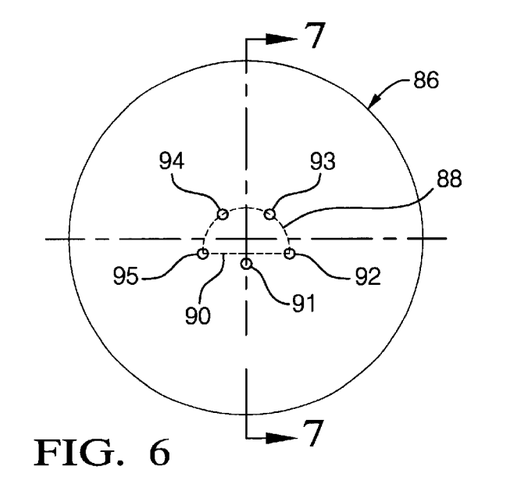
FIG. 6 is a view similar to FIG. 4 showing the spray hole pattern at the end of a modified injector nozzle.
Figure 7:
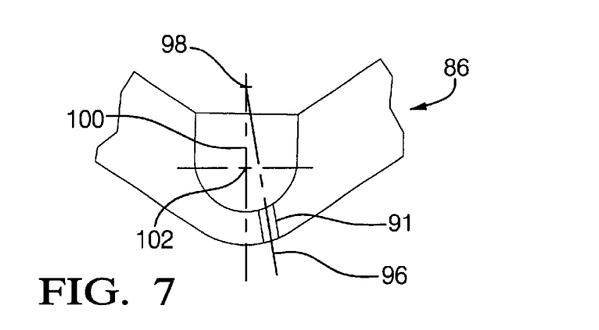
FIG. 7 is cross-sectional view of the nozzle of FIG. 6 showing the relocation of the spray hole center axis for the intermediate (center) hole along the straight line portion of the pattern.

This was provided in the modified spray nozzle 86 shown in FIGS. 6 and 7. In this modified embodiment, an approximately semicircular pattern is formed by a semicircular arc 88 and a straight line 90 including five spray holes 91, 92, 93, 94 and 95. Spray holes 92, 93, 94, 95 are spaced around the arc 88 with holes 92 and 95 located at the ends of the straight line 90, which is identical to the earlier embodiment. However, the center spray hole 91 is shifted slightly below or beyond the straight line 90 so that its axis 96 is drawn from a center 98 on the central axis 100 of the spray nozzle 86 but located above the common center 102 from which the axes of the remaining four spray holes 92, 93, 94, and 95 are drawn. The result is that fuel entering the sac and passing into the spray hole 91 is required to make a sharper turn to enter the spray hole. By this change, the turbulence formed in each of the spray holes by the change in direction of the fuel entering the holes is made essentially equal and so the penetration of the fuel spray is essentially equalized.

Figure 8:
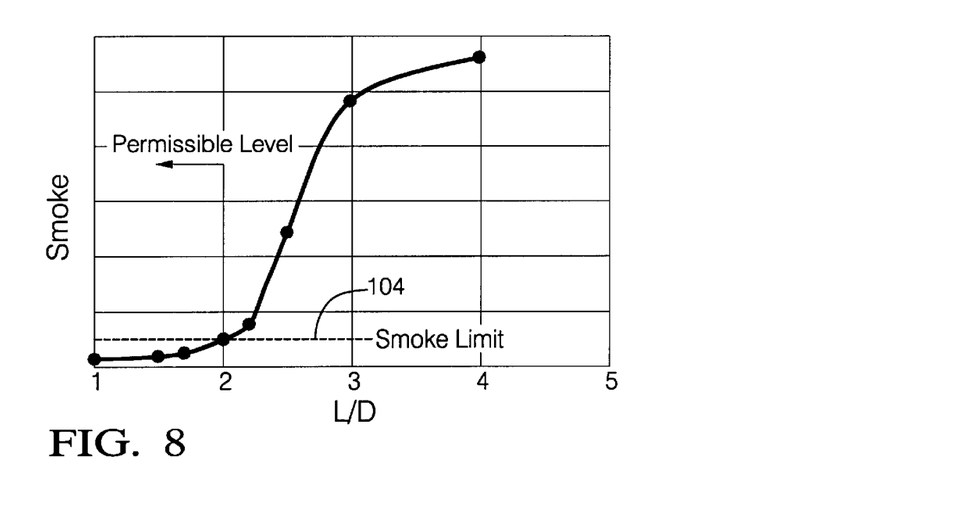
FIG. 8 is a diagram indicating the relationship of smoke developed in engine tests relative to the L/D ratio of the injector spray holes.

FIG. 8 is a graph illustrating the results of tests on the nozzle of FIGS. 6 and 7 showing the relationship of the L/D ratio of the spray nozzles to the smoke generated by combustion with nozzles of various L/D ratios. Note that at an L/D ratio of 2, the smoke level reaches the smoke limit indicated by the line 104 of the graph while at L/D ratios below 2 the amount of smoke created is reduced.

Figure 9:
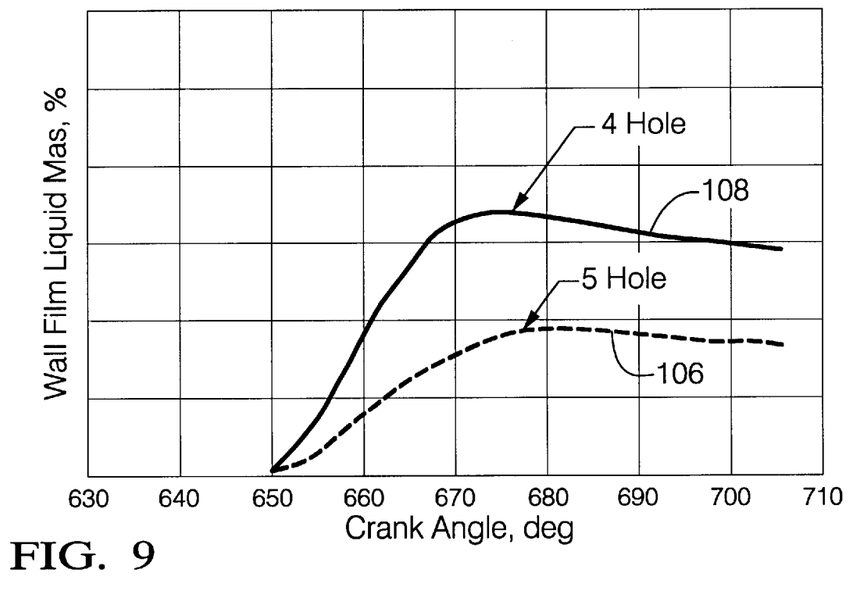
FIG. 9 is a diagram indicating the predicted wall film liquid mass for four hole and five hole injectors.

FIG. 9 is another graph showing the predicted wall film liquid mass on the surface of the piston for four hole and five hole injectors at various crank angle locations of the piston. Note that the five hole nozzle shown by line 106 shows a much lower mass of liquid fuel on the piston surface than the four hole nozzle indicated by line 108.

The results of tests indicate that a five hole spray nozzle with an L/D ratio of not more than two provides very favorable operational conditions of smoke, BSFC and wall film liquid mass for the engine of the specific size and configuration tested. It should be understood however that the application of the semicircular spray pattern of the present invention to direct injection spark ignition engines of larger size could result in best operating conditions being reached with a larger number of spray holes, possibly up to ten in the pattern. depending of course on their desired size and the amount of fuel to be injected at each cylinder cycle.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A spark ignition direct injection engine having a combustion chamber defined by a cylinder and a piston reciprocable therein; and a fuel injector having an injection nozzle mounted in the engine to direct a fuel spray into the combustion chamber;

the nozzle having plurality of spray holes formed in a generally semicircular pattern wherein the spray holes have a L/D (length over diameter) ratio of not more than 2.0.

2. An engine as in claim 1 wherein the number of spray holes is in a range of from 5 to 10 holes.

3. An engine as in claim 1 wherein the number of spray holes is in a range of from 5 to 6 holes.

4. An engine as in claim 1 wherein the number of spray holes is 5.

5. An engine as in claim 1 wherein a pattern of fuel spray at a fixed distance below the injector nozzle under atmospheric conditions approximates a semicircle formed by an arc having ends connected by a straight line and intermediate positions of the sprays are spaced along the arc and the straight line.

6. An engine as in claim 1 wherein:

the injector nozzle has an end wall including a valve seat with an internal sac below the seat;

the sac and the wall have, respectively, part spherical inner and outer surfaces formed with a common center;

the pattern of the spray holes includes a semicircle formed by an arc having ends connected by a straight line wherein the spray holes have outlet openings that are spaced along the arc and the straight line; and the spray holes lying on the semicircle have axes extending from the common center while the spray holes lying only on the straight line have axes misaligned from the common center.

7. An engine as in claim 6 wherein the misaligned axes intersect a longitudinal axis of the nozzle inward of the common center and the outlet openings of the associated spray holes lie slightly below the straight line.

8. An engine as in claim 7 wherein the number of spray holes is 5, and four of the spray holes lie on the semicircle, while a central spray hole is centered along and slightly below the straight line and has an axis intersecting a longitudinal axis of the nozzle.

9. An engine as in claim 1 wherein the engine combustion chamber has an intake side and an exhaust side, the piston has an upper surface with a recess extending from a central area toward the intake side, the fuel injection nozzle is disposed on the intake side with an axis sloping downward toward the piston recess, and the pattern of the spray holes includes a semicircle formed by an arc having ends connected by a straight line, wherein the spray holes are spaced along the arc and along the straight line and the holes along the straight line are directed toward the intake side of the recess while the holes along the arc away from the straight line are directed toward the central area of the piston on the exhaust side of the recess.

10. A fuel injector for a spark ignition direct injection engine, the injector comprising:

an injection nozzle mountable in an engine to direct a fuel spray into a combustion chamber;

the nozzle having plurality of spray holes formed in a generally semicircular pattern wherein the spray holes have a L/D (length over diameter) ratio of not more than 2.0.

11. A fuel injector as in claim 10 wherein the pattern of fuel spray at a fixed distance below the injector nozzle under atmospheric conditions approximates a semicircle formed by an arc having ends connected by a straight line and the central positions of the sprays are spaced along the arc and the straight line.

12. A fuel injector as in claim 10 wherein the injector nozzle has an end wall including a valve seat with an internal sac below the seat;

the sac and the wall have, respectively, part spherical inner and outer surfaces formed with a common center;

the pattern of the spray holes includes a semicircle formed by an arc having ends connected by a straight line wherein the spray holes have outlet openings that are spaced along the arc and the straight line; and the spray holes lying on the semicircle have axes extending from the common center while the spray holes lying only on the straight line have axes misaligned from the common center.

13. A fuel injector as in claim 12 wherein the misaligned axes intersect a longitudinal axis of the nozzle inward of the common center and the outlet openings of the associated spray holes lie slightly below the straight line.

14. A fuel injector as in claim 13 wherein number of spray holes is 5, and four of the spray holes lie on the semicircle, while a central spray hole is centered along and slightly below the straight line and has an axis intersecting a longitudinal axis of the nozzle.

15. A fuel injector as in claim 10 wherein the number of spray holes is 5.

16. A fuel injector as in claim 10 wherein the number of spray holes is in a range of from 5 to 6 holes.

17. A fuel injector as in claim 10 wherein the number of spray holes is in a range of from 5 to 10 holes.

* * * * *

(12) EX PARTE REEXAMINATION CERTIFICATE (7344th)
United States Patent
Lippert et al.

(10) Number: US 6,659,074 C1
(45) Certificate Issued: Feb. 2, 2010

(54) SPARK IGNITION DIRECT INJECTION ENGINE WITH SHAPED MULTIHOLE INJECTORS

(75) Inventors: Andreas M. Lippert, Rochester Hills, MI (US); Sherif Hussein El Tahry, Troy, MI (US); Hiroaki Inoue, Hamamatsu Shizuoka (JP); Takahiro Noyori, Hamamatsu Shizuoka (JP)

(73) Assignees: General Motors Corporation, Detrioit, MI (US); Suzuki Motor Corporation, Shizuoka (JP)

Reexamination Request:
No. 90/010,202, Jul. 30, 2008
No. 90/010,545, May 19, 2009

Reexamination Certificate for:
Patent No.: 6,659,074
Issued: Dec. 9, 2003
Appl. No.: 10/325,655
Filed: Dec. 20, 2002

Related U.S. Application Data

(60) Provisional application No. 60/378,738, filed on May 8, 2002.

(51) Int. Cl.
*F02M 61/00* (2006.01)
*F02M 61/18* (2006.01)
*F02B 23/10* (2006.01)
*F02B 75/00* (2006.01)
*F02B 75/12* (2006.01)
*F02B 3/00* (2006.01)
*F02F 1/24* (2006.01)

(52) U.S. Cl. .................. 123/299; 123/305; 239/533.12; 239/601
(58) Field of Classification Search ................. 123/299, 123/305; 239/533.12, 601
See application file for complete search history.

(56) References Cited

U.S. PATENT DOCUMENTS 5,163,621 A 11/1992 Kato et al.
2003/0127547 A1 7/2003 Nowak

FOREIGN PATENT DOCUMENTS

| DE | 40 39 520 A1 | 7/1991 |
| DE | 100 59 007 A1 | 5/2002 |
| EP | 0 781 918 A1 | 7/1997 |
| JP | 2002-038957 | 2/2002 |
| JP | 2002-257004 | 9/2002 |

*Primary Examiner*—Sara S Clarke (57) ABSTRACT

A fuel injector for a spark ignition direct injection engine includes an injection having plurality of spray holes formed in a generally semicircular pattern wherein the spray holes have a L/D (length over diameter) ratio of not more than 2.0. In a preferred embodiment, the injector nozzle has an internal sac and an end wall with part spherical inner and outer surfaces formed with a common center, the pattern of the spray holes includes a semicircle formed by an arc having ends connected by a straight line wherein the spray holes have outlet openings that are spaced along the arc and slightly below the straight line, and the spray holes lying on the semicircle extend from the common center while the spray holes lying below the straight line have axes extending from above the common center. In an engine, the flat side of the spray is aimed toward the near side of a piston bowl recess.

Semi-circular spray pattern (footprint)

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–17 is confirmed.

* * * * *